(No Model.)
W. C. & W. H. TOLES.
RAPID ACTING VISE.
No. 528,190. Patented Oct. 30, 1894.
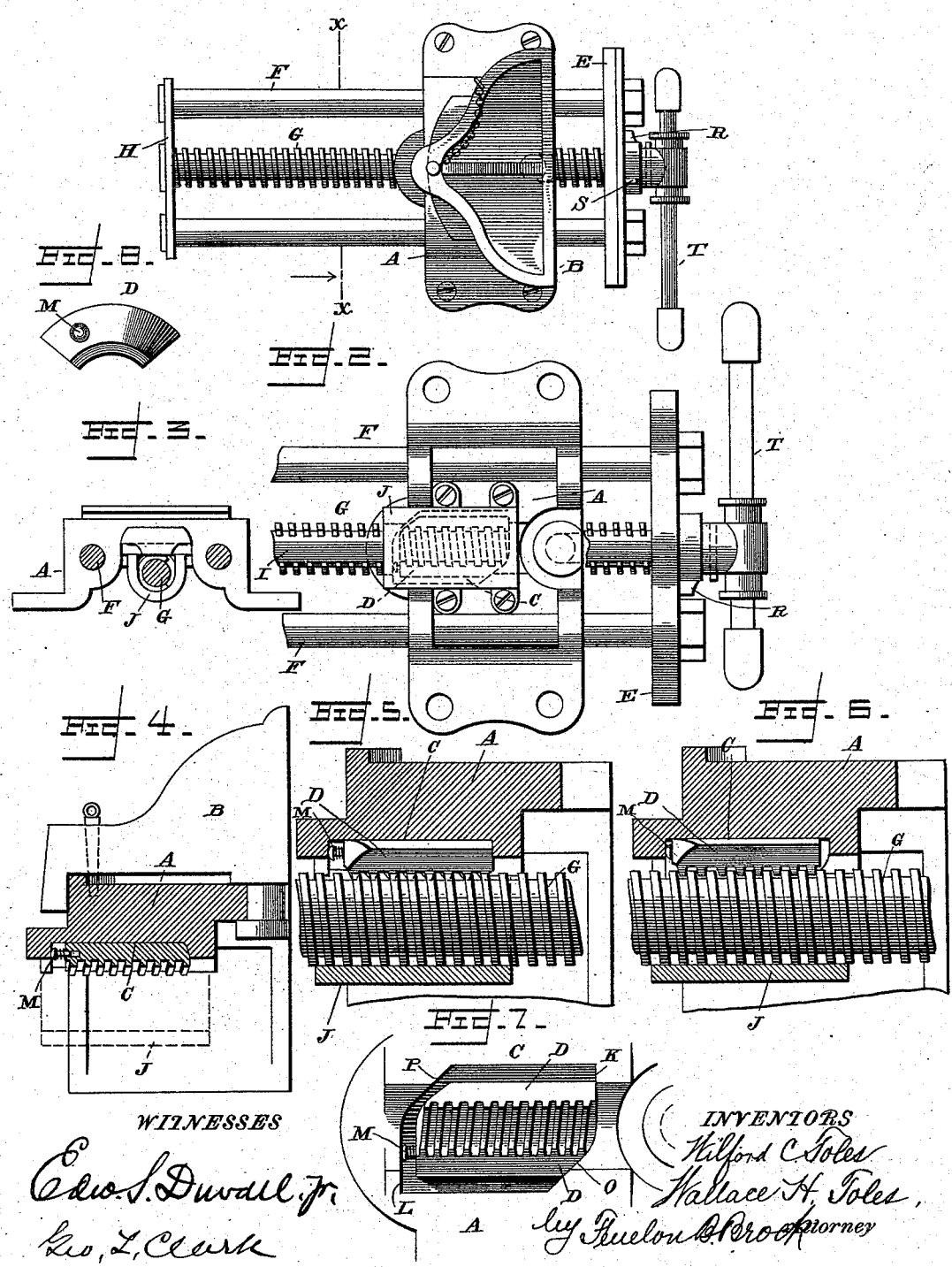
WITNESSES
Edw. S. Duvall, Jr.
Geo. L. Clark
INVENTORS
Wilford C. Toles
Wallace H. Toles
by Fenelon B. Brock Attorney

UNITED STATES PATENT OFFICE.

WILFORD C. TOLES AND WALLACE H. TOLES, OF CHICAGO, ILLINOIS.

RAPID-ACTING VISE.

SPECIFICATION forming part of Letters Patent No. 528,190, dated October 30, 1894.

Application filed February 9, 1894. Serial No. 499,645. (No model.)

*To all whom it may concern:*

Be it known that we, WILFORD C. TOLES and WALLACE H. TOLES, citizens of the United States, residing at Chicago, in the county of Cook, State of Illinois, have invented certain new and useful Improvements in Rapid-Acting Vises; and we do declare the following to be a full, clear, and exact description of the invention, such as will enable others skilled in the art to which it appertains to make and use the same, reference being had to the letters of reference marked on the accompanying drawings, which form a part of this specification.

Figure 1 is a plan of a vise to which we have applied our rapid-acting improvements. Fig. 2 is a bottom view, partly broken away. Fig. 3 is a cross-section on line $x$ $x$ of Fig. 1. Fig. 4 is a central longitudinal section and elevation through the vise-bed and attached parts, and Figs. 5 and 6 are similar views exemplifying the operation of our invention. Fig. 7 is a bottom view of the vise-bed, showing our improved nut in its seat. Fig. 8 is an end view of the nut.

Figs. 1 and 2 are on a smaller scale than the remaining figures.

The object of our invention is to produce a rapid-acting vise, in which the nut and screw are so constructed that they enable the operator to adjust the vise to the work with one motion of the hand, without the employment of any trigger, catch or locking device of any kind.

The device is positive in its work and absolutely reliable.

Our improvements therefore consist in the following construction and combination of the parts, the details of which will first be fully described and the features of novelty therein then pointed out in the claims.

In the drawings—A represents the bed-piece of the vise which is bolted to the table or other support.

B is the inner jaw of the bed A which may be swiveled thereon, as shown, or rigid therewith, as desired.

The under side of the bed-piece A is provided with a seat C for the nut D. This seat may be cast with the bed A, as shown, or it may constitute a separate piece and be bolted to the bed A.

E is the outer movable jaw. It is carried upon guide-rods F upon either side of the operating screw G, which rods F slide in bearings in the bed A.

H is a cross-brace connecting the inner ends of both rods E and the intermediate screw G, the latter having a swiveled bearing therein. The brace H serves as a guide and support for the rods and screw and steadies the movement. The main screw G has a groove or spline I cut longitudinally therein of any desirable length and width, the screw threads being entirely cut away along the groove.

D is the main nut, which is made of any desired length. The width of the threads of this mutilated nut correspond with the width of the groove I in screw G, being slightly less than the groove, so that the screw may slide freely back and forth whenever the groove and nut register.

J is a cap or box-sleeve bolted to the bed A under the nut D and screw G to maintain the parts in operative position.

The nut-seat C has a concave rounded segmental bearing, and the nut D seated therein has a corresponding convex segmental bearing, permitting a rotary oscillating movement to the nut. Seat C is also longer than the nut D within which the latter has also a longitudinal movement. The nut D has moreover a third movement, as a resultant of the two motions above referred to, which is a spiral oscillating motion, as will be described farther on.

K is an abutment or stop in the seat C, which limits the outward travel of the nut D, and L an opposite abutment which arrests the inward play of the nut.

Any action of the main screw G, during the clamping action of the vise, which causes the nut D to rotate, brings the inner inclined or spiral face of the nut to bear against the inclined abutment O in the seat, which results in a spiral inward motion of the nut, while in the reverse movement, the inclined abutment on the opposite inner face of the nut and the spiral face P are brought into action, or the spring M may do the work, or both. Any movement which causes the nut to pass rearwardly is resisted by the spring M which tends constantly to move the nut outwardly. This spring is preferably wound around a headed sliding spindle having a loose reciprocal movement in a corresponding hole tapped in the end of the nut. The head of this spindle slides against the inner nut-seat abutments and partakes of the movement of the nut D. When the groove I of the screw G registers with the nut D (which is the position when the stop R on the screw collar rests against the lug S on the jaw E) the jaw E may be readily pushed in or pulled out. The one movement of the hand which does this and brings the jaw E up against the work, at the same time simply rotates the handle T to the right. Just prior to this movement of the handle, the screw G and nut D are in the position shown in Figs. 4, 5 and 7, and the threads thereof are at about their extreme opposite points of travel.

The ends of the contacting threads of the screw and nut may be substantially squarely abutting each other and not register. By turning the screw the nut is carried and rotated therewith upon its circular seat while the spiral abutments cause it to travel also inwardly in a spiral motion until the threads of the screw and nut do register, as seen at Fig. 6, whereupon the spring M will force the threads of the nut and screw into substantial contact. The further motion of the screw forces the nut against the outer seat-abutment K and causes the jaw E to securely clamp the work. The screw is released in the ordinary manner, by reversing the movement, and as soon as the groove I and nut register the spring M throws the nut back again against abutment K.

Instead of a spring being arranged to push the nut endwise, it may be arranged to have a pulling action, and the spring may be placed at either end of the nut. The spring may be attached to the seat instead of the nut if desired. The spiral incline abutments may also be on either or both sides of both nut and seat.

We contemplate using our peculiar nut in connection with other vise structures, such, for instance, as a vise having a cast slide or sheath, with the nut working inside the same. In such structures the rods F and cross-brace H are dispensed with.

We do not limit ourselves to the details of our invention as the same may be exemplified in other structures than the particular vise here described.

We wish to lay claim broadly to a vise-nut having a combined longitudinal and rotary movement.

We claim—

1. The combination in a rapid-acting vise, of vise jaws, a mutilated screw, a nut-seat and a mutilated nut, having both a rotary and a rectilinear movement in its seat.

2. The combination of vise jaws, a rotary mutilated screw, a nut-seat, and a mutilated nut having a rotary movement in the seat coincident with said screw.

3. The combination of vise jaws, a rotary mutilated screw a nut-seat, and a mutilated nut having a spiral movement in the seat.

4. The combination of vise jaws, a rotary mutilated screw, a segmental nut-seat, and a mutilated nut having a corresponding segmental bearing in said nut-seat and adapted to move therein.

5. The combination of a nut-seat having an arc-shaped concavity and an inclined wall at one end thereof, and a nut placed therein having a spiral movement in said seat.

6. The combination of a nut-seat having an arc-shaped concavity and an inclined wall at one end thereof, a nut correspondingly formed to the nut-seat, and a spring, or equivalent, for forcing the nut to one end of the seat.

In testimony whereof we affix our signatures in the presence of two witnesses.

WILFORD C. TOLES.
WALLACE H. TOLES.

Witnesses:
W. H. SMITH,
H. W. LONG.